United States Patent
Haugen et al.

(10) Patent No.: US 8,976,226 B2
(45) Date of Patent: Mar. 10, 2015

(54) GENERATING AN ANIMATED PREVIEW OF A MULTI-PARTY VIDEO COMMUNICATION SESSION

(71) Applicant: Google Inc., Mountain View, CA (US)

(72) Inventors: Frances Bordwell Haugen, Mountain View, CA (US); Alexander Ketner Unger, San Francisco, CA (US)

(73) Assignee: Google Inc., Mountain View, CA (US)

( * ) Notice: Subject to any disclaimer, the term of this patent is extended or adjusted under 35 U.S.C. 154(b) by 214 days.

(21) Appl. No.: 13/651,717

(22) Filed: Oct. 15, 2012

(65) Prior Publication Data
US 2014/0104365 A1    Apr. 17, 2014

(51) Int. Cl.
H04N 7/14    (2006.01)

(52) U.S. Cl.
USPC ............................ 348/14.1; 370/260; 709/204

(58) Field of Classification Search
CPC . H04L 12/1813; H04L 12/1822; H04M 3/567
USPC ............................ 370/260; 709/204; 348/14.1
See application file for complete search history.

(56) References Cited

U.S. PATENT DOCUMENTS

| | | | |
|---|---|---|---|
| 6,717,607 B1 * | 4/2004 | Lauper et al. | 348/14.08 |
| 6,795,107 B1 * | 9/2004 | Neal et al. | 348/14.08 |
| 2003/0167176 A1 * | 9/2003 | Knudson et al. | 705/1 |
| 2004/0045030 A1 | 3/2004 | Reynolds et al. | |
| 2006/0164508 A1 | 7/2006 | Eshkoli et al. | |
| 2006/0291473 A1 * | 12/2006 | Chase et al. | 370/395.5 |
| 2011/0279634 A1 | 11/2011 | Periyannan et al. | |
| 2012/0059873 A1 * | 3/2012 | Anikin et al. | 709/203 |
| 2013/0117131 A1 * | 5/2013 | Robinson et al. | 705/14.72 |

OTHER PUBLICATIONS

Inat, "A Guide to Creating an Animated GIF from a Video", www.inat.org/page4.ntml, printed May 3, 2012, 6 pages.
Bloggif, "Montage Photo Gratuit et Creation de GIF animes en ligne !", www.bloggif.com, printed May 3, 2012, 3 pages.
International Search Report and Written Opinion for PCT Application No. PCT/US13/59955, dated Apr. 7, 2014, 18 pages.

* cited by examiner

Primary Examiner — Creighton Smith
(74) Attorney, Agent, or Firm — Patent Law Works LLP

(57) ABSTRACT

A system and method for generating an animation based at least in part on video content associated with a multi-party video communication session are disclosed. In one embodiment, the system includes a video receiver module, a video sampler module, a conversion module, a request receiver module and an animation display module. The video receiver module receives video content of a multi-party video communication session including video content of each of one or more participating devices. The video sampler module generates a plurality of video frames based on the video content. The conversion module generates a plurality of images each image based on one of the plurality of video frames and generates an animation file based on the plurality of images. The request receiver module receives a request from a user. The animation display module, based on the request, provides for display textual content, the animation file, and a connection.

21 Claims, 6 Drawing Sheets

GENERATING AN ANIMATED PREVIEW OF A MULTI-PARTY VIDEO COMMUNICATION SESSION

The specification relates to generating an animation. In particular, the specification relates to generating an animation based at least in part on video content associated with a multi-party video communication session.

BACKGROUND

Animated files, or "animations," are useful for a number of reasons. Animations may use less system resources than video content. For example, less bandwidth may be required to display an animation in a browser than video content. Animations may be more universally compatible with various users' devices and software configurations. For example, many Internet browsers include built in functionality to display animated GIF files; however, video content often requires the installation of a separate codec or player before the video file may be displayed. Animations may be easier to embed and/or display than video content. For example, it may be difficult to display a live stream of video content on every search result page, but relatively easy to embed and/or display an animation on every search result page.

A first problem is that current systems do not allow the conversion of video content into an animated file format. Specifically, current systems do not allow the conversion of video content of a multi-party video communication session into an animated file. A second problem is that current systems do not allow video content of a multi-party video communication session, which includes video content of each of a plurality of participating devices, to be converted into a single animation file ensuring the proper playback of the animation. A third problem is that current systems do not allow a user to preview a multi-party communication session before joining/connecting to the multi-party communication session. Therefore, current systems lack a mechanism to showing the user who is participating and/or what is happening in the multi-party communication session thereby eliminating any user apprehension about joining the multi-party communication session.

SUMMARY

The specification overcomes the deficiencies and limitations of the prior art at least in part by providing a system and method for generating an animation based at least in part on video content associated with a multi-party video communication session.

In some examples, the specification describes a system, method and computer program product for generating an animation based at least in part on video content associated with a multi-party video communication session. In one example, the system comprises a video receiver module, a video sampler module, a conversion module, a request receiver module and an animation display module.

The video receiver module receives video content of a multi-party video communication session, wherein the multi-party video communication session is associated with textual content to be displayed on one or more websites, and wherein the video content of the multi-party video communication session includes video content of each of one or more participating devices. In some embodiments, the video content includes a live video stream of the multi-party video communication session. In some embodiments, the textual content includes one or more of a webpage, a search result, a social network stream, a social network profile, an e-mail, an advertisement, a recipe, an article and a title associated with the multi-party video communication session.

The video sampler module generates a plurality of video frames based at least in part on the video content of the multi-party video communication session. In some embodiment, the video sampler module generates the plurality of video frames in part by sampling the video content at a high rate such that the animation file based at least in part on the plurality of video frames generated by the conversion module is visually indistinguishable from a video when displayed on the user device.

The conversion module generates a plurality of images, each image being generated at least in part on one of the video frames in the plurality of video frames, and generates an animation file based at least in part on the plurality of images. In some embodiments, the conversion module generates the plurality of images by converting each of the video frames into an image file having the graphical interchange format (GIF). In some embodiments, the conversion module the animation file based at least in part on the plurality of images is an animated graphics interchange format (GIF) file. In some embodiments, the video content of the multi-party video communication session received by the video receiver module includes video content of each of a plurality of participating devices; and the animation file generated by the conversion module is a single file based at least in part on the video content of each of the plurality of participating devices The request receiver module receives a request from a user device for the textual content associated with the multi-party video communication session.

The animation display module, based at least in part on the request for the textual content associated with the multi-party video communication session, provides for display, to the user device, the textual content, the animation file, and a mechanism by which the user device can be connected to the multi-party video communication session. In some embodiments, the animation file displayed by the animation display module is an up-to-date animation file based at least in part on recent video content associated with a multi-party video communication session. In some embodiments, the mechanism by which the user device can be connected to the multi-party video communication session includes a first connection mechanism and a second connection mechanism, the first connection mechanism connects the user device to the multi-party video communication session as a first type of participant when selected, the second connection mechanism connects the user device to the multi-party video communication session as a first type of participant when selected. In some embodiments, the first type of participant is an active secondary participant. In some embodiments, the second type of participant is a passive secondary participant.

In some embodiments, the system includes a video segmentation module that segments the received video content, and the video sampler module generates the plurality of video frames based at least in part on a segment of the video content of the multi-party video communication session received from the video segmentation module.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
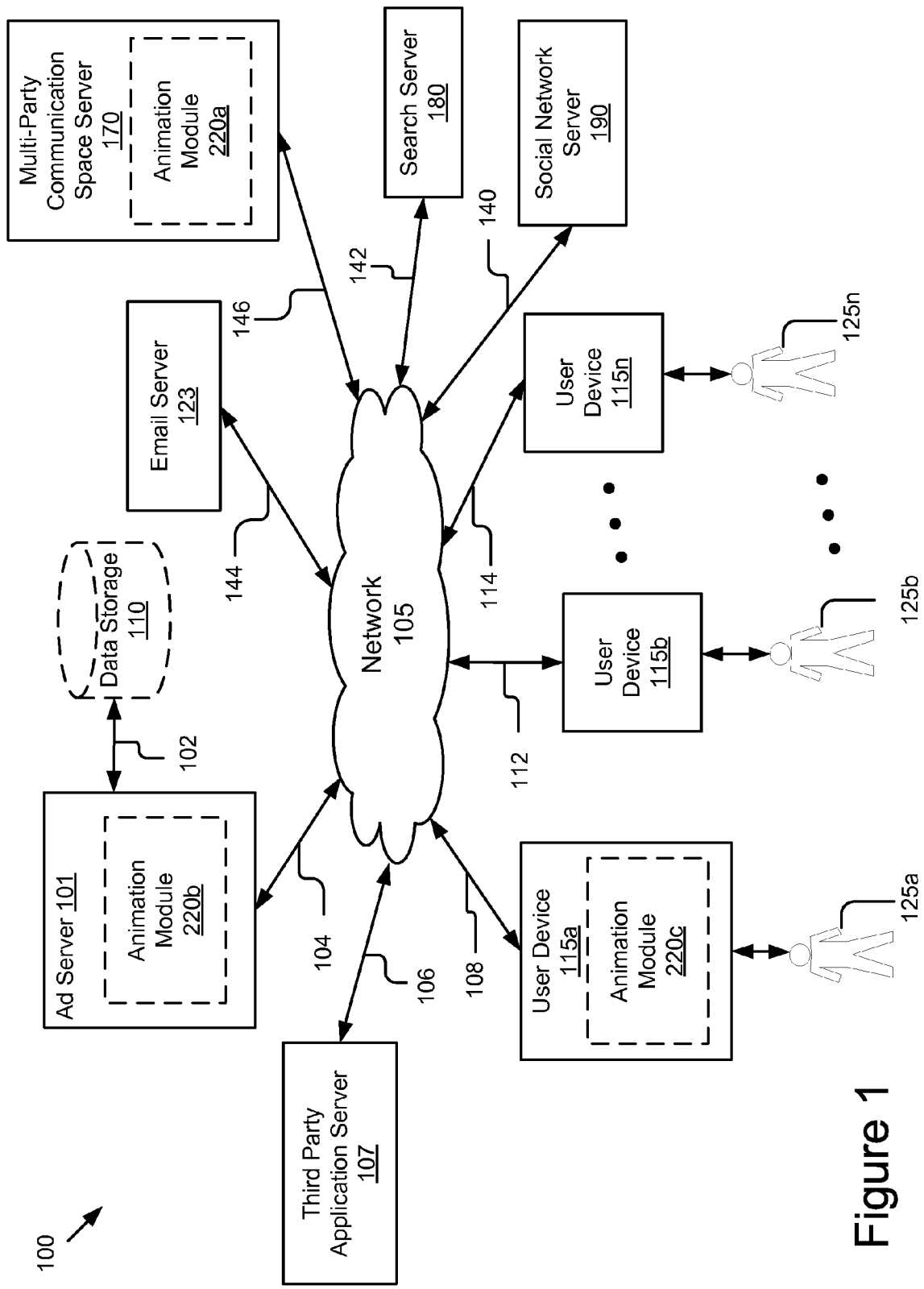
FIG. 1 illustrates a system for generating an animation based at least in part on video content associated with a multi-party video communication session according to one embodiment.

A system and method for generating an animation based at least in part on video content associated with a multi-party video communication session. For example, a system and method for generating an animated GIF based at least in part on video associated with a video chat or video conference. In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, one embodiment is described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. An exemplary embodiment is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

FIG. 1 illustrates a block diagram of a system 100 for generating an animation based at least in part on video content associated with a multi-party video communication session according to one embodiment. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125), an ad server 101, a multi-party communications space server 170, an e-mail server 123, a search server 180, a social network server 190 and a third party application server 107. In the illustrated embodiment, these entities are communicatively coupled via a network 105. Although only three user devices 115 are illustrated, any number of user devices 115 are available to any number of users 125.

The user devices 115 in FIG. 1 are used by way of example. While FIG. 1 illustrates three user devices 115, the present specification applies to any system architecture having one or more user devices 115. Furthermore, while only one network 105 is coupled to the user devices 115, the third party application server 107, the ad server 101, the search server 180, the e-mail server 123, the social network server 190 and the multi-party communications space server 170, in practice any number of networks 105 can be connected to the entities. Furthermore, while only one third party server 107, one email server 123, one search server 180 and one social network server 190 are shown, the system 100 can include any number of servers 107, 123, 180 and 190.

Although only one ad server 101 is shown, it will be recognized that multiple ad servers 101 may be present. Although only one multi-party communication space server 170 is shown, it will be recognized that multiple multi-party communication space servers 170 may be present. In one embodiment, the multi-party communication space server 170 comprises, or is comprised within, a social network. A social network is any type of social structure where the users are connected by a common feature. Examples include, but are not limited to, blogs, microblogs and Internet forums. The common feature includes friendship, family, a common interest, etc.

In one embodiment, an animation module 220a is included in the multi-party communications space server 170 and is operable on the multi-party communications space server 170, which is connected to the network 105 via signal line 146. In another embodiment, the animation module 220b is included in the ad server 101 and is operable on the ad server 101, which is connected to the network 105 via signal line 104. In another embodiment, the animation module 220c is included in user device 115a and is operable on the user device 115a, which is connected to the network 105 via signal line 108. It will be recognized that although only user device 115a is illustrated comprising an animation module 220c one or more other user devices 115b-n may include an animation module 220c in addition to or instead of user device 115a. In yet another embodiment, an animation module (not shown) may be included in one or more of the other servers 107, 123, 180, 190 and is operable on the one or more other servers 107, 123, 180, 190, respectively. It will be recognized that the animation module 220a/220b/220c (referred to generally as the animation module 220) can be stored in any combination on the servers and user devices 115. In some embodiments the animation module 220 includes multiple, distributed modules that cooperate with each other to perform the functions described below. Details describing the functionality and components of the animation module 220 are explained in further detail below with regard to FIG. 3.

The network 105 enables communications between user devices 115, the ad server 101, the multi-party communication space server 170, the search server 180, the e-mail server 123, the social network server 190 and the third party application 107 server. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers). In one embodiment, the network 105 is an IP-based wide or metropolitan area network.

In some embodiments, the network 105 helps to form a set of online relationships between users 125, for example, those provided by one or more social networking systems including explicitly-defined relationships and relationships implied by social connections with other online users, where the relationships form a social graph. In some examples, the social graph can reflect a mapping of these users and how they are related.

In the illustrated embodiment, the user devices 115a, 115b and 115n are coupled to the network 105 via signal lines 108, 112 and 114, respectively. The user 125a can interact with the user device 115a. Similarly, the user 125b can interact with the user device 115b, and the user 125n can interact with the user device 115n. The third party application server 107 is communicatively coupled to the network 105 via signal line 106. The e-mail server 123 is communicatively coupled to the network 105 via signal line 144. The search server 180 is communicatively coupled to the network 105 via signal line 142. The ad server 101 is communicatively coupled to the network 105 via signal line 104. In one embodiment, the ad server 101 is communicatively coupled to data storage 110 via signal line 102. The multi-party communication space server 170 is communicatively coupled to the network 105 via signal line 146. The social network server 190 is communicatively coupled to the network 105 via signal line 140.

In one embodiment, the data storage 110 stores data and information for generating an animation based at least in part on video content associated with a multi-party video communication session. Examples of data and information for generating an animation based at least in part on video content associated with a multi-party video communication session include, but are not limited to, one or more of video content associated with a multi-party video communication session, a plurality of video frames based at least in part on the video content, a plurality of images based at least in part on the video frames and an animation file based at least in part on the plurality of images. In one embodiment, which is discussed below, a storage device 214 (see FIG. 2) is included in a computing device 200 (e.g. an ad server 101) and the storage device 214 stores the data and information for generating an animation based at least in part on video content associated with a multi-party video communication session.

In one embodiment, the user device 115 is an electronic device having a web browser (not shown) for interacting with the various servers 101, 107, 123, 170, 180, 190 and user devices 115 of the system 100 via the network 105 and is used by a user 125 to access information in the system 100. The user device 115 can be, for example, a laptop computer, a desktop computer, a tablet computer, a mobile telephone, a television with one or more processors embedded therein and/or coupled thereto, a personal digital assistant (PDA), a mobile email device, a portable game player, a portable music player or any other electronic device capable of accessing a network. One having ordinary skill in the art will recognize that other types of client devices 115 are possible. In one embodiment, the system 100 comprises a combination of different types of client devices 115. For example, a combination of a personal computer, a mobile phone and a tablet computer. The user 125 is a human user of the user device 115.

Figure 2:
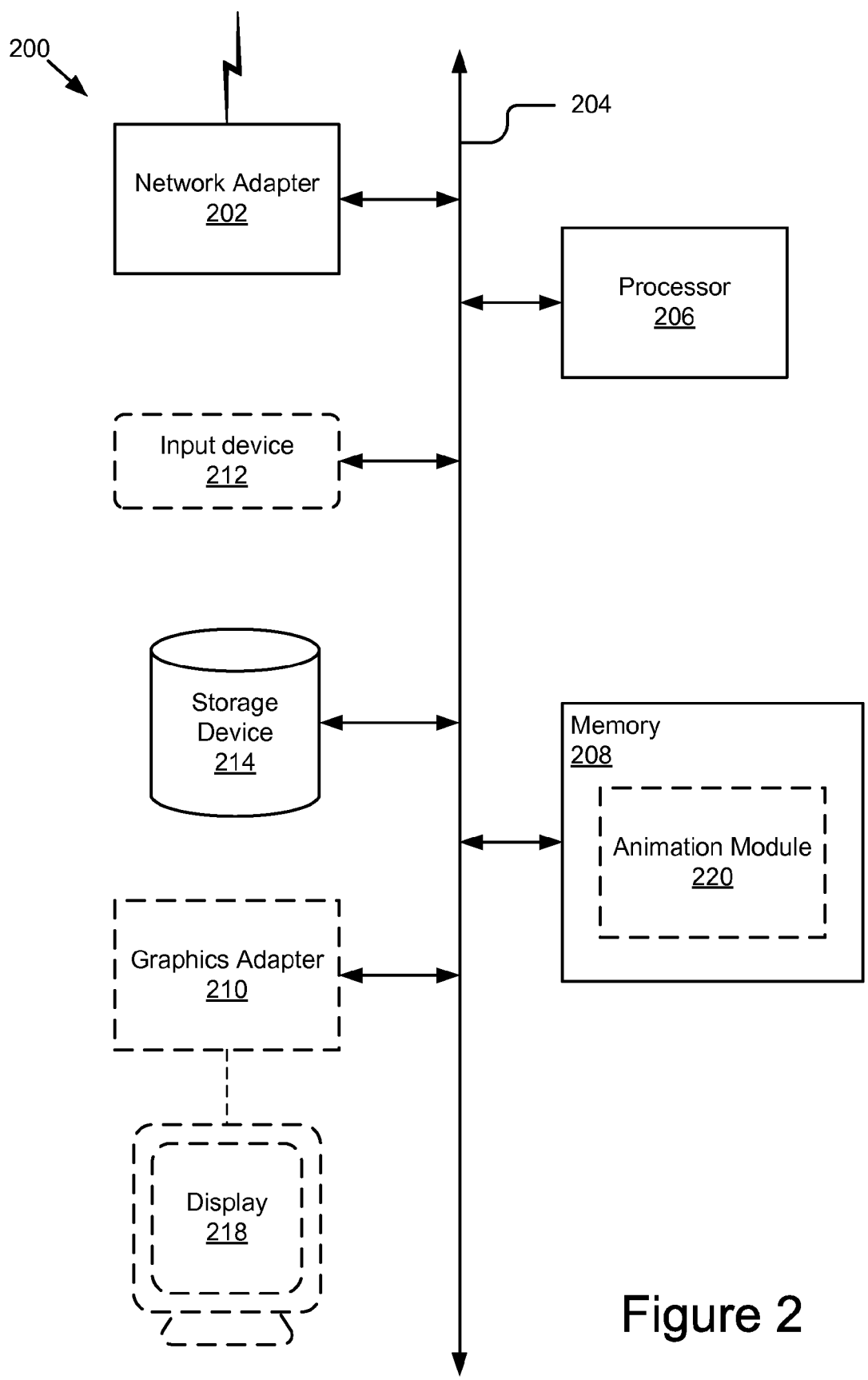
FIG. 2 is a block diagram illustrating a computing device according to one embodiment.

FIG. 2 is a block diagram of a computing device 200 according to one embodiment. As illustrated in FIG. 2, the computing device 200 includes a network adapter 202 coupled to a bus 204. According to one embodiment, also coupled to the bus 204 are at least one processor 206, a memory 208, a graphics adapter 210, an input device 212 and a storage device 214. In one embodiment, the memory 208 comprises an animation module 220. In one embodiment, the functionality of the bus 204 is provided by an interconnecting chipset. The computing device 200 also includes a display 218, which is coupled to the graphics adapter 210.

The processor 206 may be any general-purpose processor. The processor 206 comprises an arithmetic logic unit, a microprocessor, a general purpose controller or some other processor array to perform computations and execute code and routines. The processor 206 is coupled to the bus 204 for communication with the other components of the computing device 200. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. It will be obvious to one skilled in the art that other processors, operating systems, sensors, displays and physical configurations are possible.

The memory 208 is a non-transitory storage medium. The memory 208 holds instructions and/or data that may be executed by the processor 206. In one embodiment, the instructions and/or data stored on the memory 208 comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the computing device 200. In one embodiment, the animation module 220 is stored in memory 208 and executable by the processor 206.

The computing device 200, in one embodiment, is an ad server 101. In one such embodiment, the ad server 101 contains the animation module 220. In one embodiment, the computing device 200 is a user device 115. In one such embodiment, the user device 115 contains the animation module 220. In one embodiment, the computing device 200 is a multi-party communication space server 170. In one such embodiment, the multi-party communication space server 170 contains the animation module 220. Details describing the functionality and components of the animation module 220 are explained in further detail below with regard to FIG. 3.

An embodiment of the multi-party communication space server 170 allows multiple users to communicate in a multi-party communication session. Users 125 participating in a multi-party communication session are occasionally referred to herein as "participants." For example, in one embodiment, the user devices 115 of participants of the multi-party communication session are all connected to the multi-part communication space server 170, which is a central server. In another embodiment, a multi-party communication session uses peer-to-peer communication between the user devices 115 of the participants.

In one embodiment, the multi-party communication session includes at least one primary participant (e.g. a moderator) and one or more secondary participants and allows the participants to communicate with one another. In one embodiment, communication between one or more participants is unilateral. For example, participant A in the multi-party communication session may see and/or hear the other participants in the multi-party communication session, but participant A may not be seen and/or heard by the other participants. It will be recognized that the preceding is merely an example of unilateral communication and that other examples exist.

A secondary participant that may see and/or hear the other participants but may not be seen and/or heard by the other participants is occasionally referred to herein as a "passive secondary user" or a "viewer." In one embodiment, a user (i.e. potential secondary participant) is given the option to actively or passively participate in the multi-party communication session prior to joining the multi-party communication session. For example, assume the potential secondary participant is presented with a first and second button (or other connection mechanism). The first button, when selected via the user's user device 115, connects that user to the multi-party communication session as an active secondary participant. The second button, when selected via the user's user device 115, connects that user to the multi-party communication session as viewer. In one embodiment, a secondary user is given the option to alternate between active and passive participation in the multi-party communication session. For example, assume the secondary participant is presented with an "invisible" button that when selected causes the previously active active secondary participant to become a viewer and when deselected causes a viewer to become an active secondary participant.

In one embodiment, a multi-party communication session is public allowing any user to join and participate in the multiparty communication session. In some embodiments, a user must be logged in (e.g. logged into the multi-party communication space server 170) in order to join a multi-party communication session.

A multi-party communication session allows for one or more of audio and visual communication. Examples of a multi-party communication session include but are not limited to one or more of a chat session, voice conference, video conference, etc. In one embodiment, a multi-party communication session displays video or other visual representations of one or more participating users. A multi-party communication session that displays video or other visual representations of one or more participating users is occasionally referred to herein as a "multi-party video communication session," and the video or other visual representations of the one or more participating users is occasionally referred to as "video content." In one such embodiment, the multi-party video communication session includes both audio and video communication. It will be realized that the preceding are merely examples of multi-party communications sessions and that other examples exist.

In one embodiment, the computing device 200 is a social network server 190. An embodiment of the social network server 190 allows users 125 of user devices 115 to perform social functions between other users 125 of user devices 115 within the system 100. In one embodiment, the social network server 190 comprises, or is comprised within, a social network. In another embodiment, the computing device 200 is an email server 123. In another embodiment, the computing device 200 is a third party server 107. In another embodiment, the computing device 200 is a search server 180.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 stores data and information for generating an animation based at least in part on video content associated with a multi-party video communication session. For example, the data and information discussed above in reference to data storage 110.

The input device 212 may include a mouse, track ball, or other type of pointing device to input data into the computing device 200. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to a local or wide area network.

The animation module 220 is code and routines executable by the processor 206 for generating an animation based at least in part on video content associated with a multi-party video communication session. In one embodiment, the animation module 220 is a set of instructions executable by the processor 206. In another embodiment, the animation module 220 is stored in the memory 208 and is accessible and executable by the processor 206. Details describing the functionality and components of the animation module 220 are explained in further detail below in reference to FIG. 3.

As is known in the art, a computing device 200 can have different and/or other components than those shown in FIG. 2. For example, the computing device can have speakers or another form of audio output. In addition, the computing device 200 can lack certain illustrated components. For example, in one embodiment, the computing device 200 is an ad server 101 and lacks an input device 212, graphics adapter 210 and/or display 218. Moreover, the storage device 214 can be local and/or remote from the computing device 200 (e.g., a storage area network (SAN)).

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208 and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
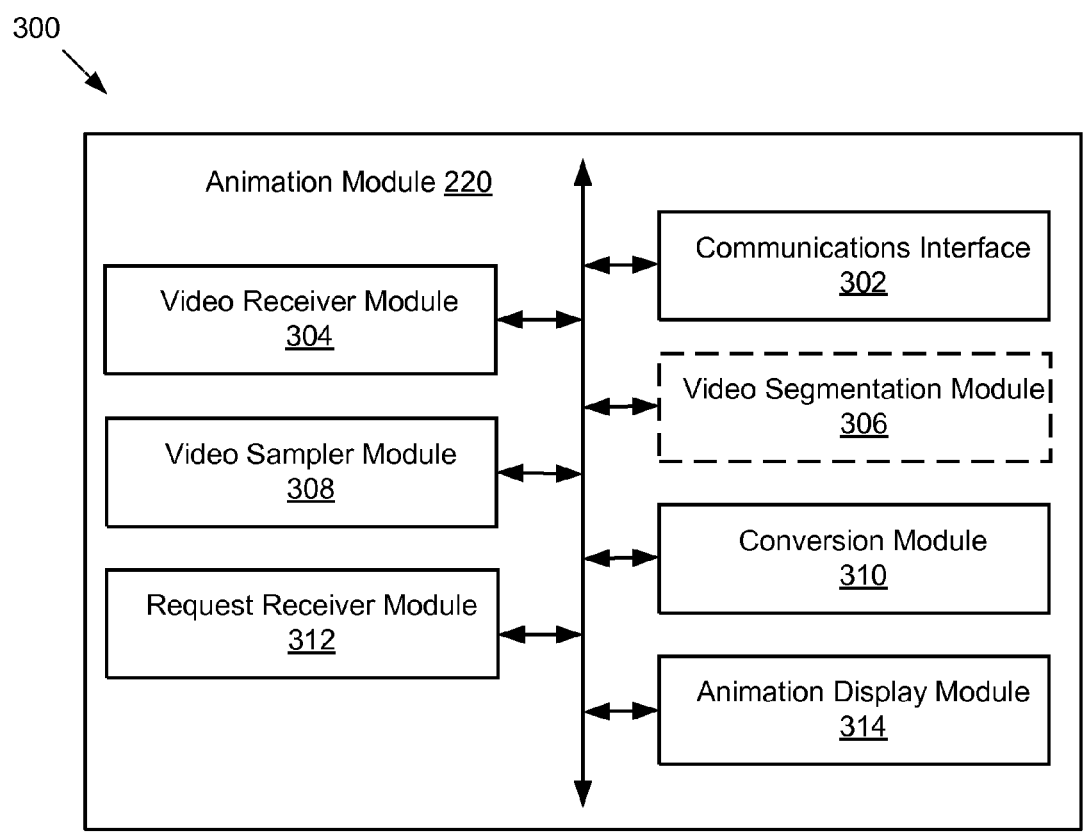
FIG. 3 is a block diagram illustrating an animation module according to one embodiment.

Referring now to FIG. 3, the animation module 220 is shown in more detail. FIG. 3 is a block diagram of the animation module 220 included in a computing device 200 (e.g., an ad server 101).

In one embodiment, the animation module 220 comprises a communications interface 302, a video receiver module 304, an optional video segmentation module 306, an video sampler module 308, a conversion module 310, a request receiver module 312 and an animation display module 314.

It will be recognized that the modules 302, 304, 306, 308, 310, 312, 314 comprised in the animation module 220 are not necessarily all on the same computing device 200. In one embodiment, the modules 302, 304, 306, 308, 310, 312, 314 are distributed across multiple computing devices 200. For example, in one embodiment, the request receiver module 312 and the animation display module 314 are included in the ad server 101 and the other modules 302, 304, 306, 308, 310 are included in the multi-party communications space server 170. It will be recognized that the preceding is just an example of distributing modules across multiple computing devices 200 and that other examples exist.

The communication interface 302 is code and routines for handling communications between the video receiver module 304, the video segmentation module 306, the video sampler module 308, the conversion module 310, the request receiver module 312, the animation display module 314 and other components of the computing device 200. In one embodiment, the communication interface 302 is a set of instructions executable by the processor 206. In another embodiment, the communication interface 302 is stored in the memory 208 and is accessible and executable by the processor 206. In either embodiment, the communication interface 302 is adapted for cooperation and communication with the processor 206, other components of the computing device 200 and other components of the animation module 220.

The communication interface 302 handles communications between the video receiver module 304, the video segmentation module 306, the video sampler module 308, the conversion module 310, the request receiver module 312, the animation display module 314 and other components of the computing device 200. For example, the communication interface 202 communicates with the video sampler module 308 and the conversion module 310 to pass the output of the video sampler module 308 (i.e., a plurality of video frames) to the conversion module 310. However, this description may occasionally omit mention of the communication interface 302 for purposes of clarity and convenience. For example, for purposes of clarity and convenience, the above scenario may be described as the video sampler module 308 passing the video frames to the conversion module 310.

The video receiver module 304 is code and routines for receiving video content of a multi-party video communication session. In one embodiment, the video receiver module 304 is a set of instructions executable by the processor 206. In another embodiment, the video receiver module 304 is stored in the memory 208 and is accessible and executable by the processor 206. In either embodiment, the video receiver module 304 is adapted for cooperation and communication with the processor 206, other components of the computing device 200 and other components of the animation module 220.

The video receiver module 304 receives video content of a multi-party video communication session. The video content of the multi-party video communication session includes video content of one or more participating user devices 115. In one embodiment, the video content of the multi-party video communication session includes concurrent video content of a plurality participating user devices 115. For example, the video content of the multi-party video communication session includes video content of user devices 115a from 12:00 pm to 12:05 pm on date 1 and video content of user devices 115b from 12:00 pm to 12:05 pm on date 1. It will be recognized that the preceding is merely an example of concurrent video content of a plurality participating user devices 115 and that other examples exist.

In one embodiment, at least one of the one or more participating user devices 115 is associated with a primary participant (e.g. a moderator). For example, assume it is desired that the animation include an animation of the moderator(s) and secondary participants of the multi-party video communication session, in one embodiment, the video receiver module 304 receives video content of the user device(s) 115 associated with the moderator(s) and of the user devices 115 associated with the secondary participants of the multi-party video communication session. In one embodiment, the video content of the multi-party video communication session includes only video content of the one or more participating user devices 115 associated with a primary participant. For example, assume it is desired that the animation include an animation of only the moderator(s) and no secondary participants of the multi-party video communication session, in one embodiment, the video receiver module 304 receives video content of the user device(s) 115 associated with the moderator(s) of the multi-party video communication session. It will be recognized that the preceding are merely examples of video content of the multi-party video communication session including video content of at least one participating user devices 115 associated with a primary participant and that other examples exist.

In one embodiment, at least one of the one or more participating user devices 115 is associated with a secondary participant. For example, assume it is desired that the animation include an animation of one or more secondary participants of the multi-party video communication session, in one embodiment, the video receiver module 304 receives video content of the user devices 115 associated with the one or more secondary participants of the multi-party video communication session. It will be recognized that the preceding is merely an example of video content of the multi-party video communication session including video content of at least one participating user devices 115 associated with a secondary participant and that other examples exist.

In one embodiment, the video receiver module 304 does not receive video content of a participating user devices 115 associated with a passive secondary participant. For example, in one embodiment, the video receiver module 304 receives video content of the multi-party video communication session including video content of all participating user devices 115 associated with either a primary participant or an active secondary participant. In another example, assume a user prefers to participate passively by simply viewing the multi-party video communication session, in one embodiment, the video receiver module 304 does not receive the video content of the user devices 115 associated with that passive secondary participant of the multi-party video communication session. It will be recognized that the preceding are merely examples of the video receiver module 304 not receiving video content of a participating user devices 115 associated with a passive secondary participant and that other examples exist.

In some embodiments, the activities of the video receiver module 304 described herein, e.g., receiving video content of one or more participating user devices 115, are performed subject to user consent. In one embodiment, a participant is prompted to explicitly allow video content of his/her participating user device 115 to be received by the video receiver module 304 and/or used by the animation module 220 in an animation. Further, in one embodiment, a participant may opt into/out of allowing the video content of his/her participating user device 115 to be received by the video receiver module 304 and/or used by the animation module 220 in an animation. In one embodiment, a participant opts out when the user connects to the multi-party video communication session as a secondary participant. In another embodiment, a participant opts out when the user connects to the multi-party video communication session as a viewer. It will be recognized that the preceding are merely examples of opting out and that other examples exist.

In one embodiment, the video receiver module 304 receives the video content directly. For example, assume the video receiver module 304 is included in a multi-party communication space server 170, in one embodiment, the video receiver module 304 is communicatively coupled to the one or more user devices 115 to receive the video content therefrom. In one embodiment, the video receiver module 304 receives the video content indirectly. For example, assume the video receiver module 304 is included in an ad server 101, in one embodiment, the video receiver module 304 is communicatively coupled to the multi-party communication space server 170 and receives the video content by retrieving the video content from the multi-party communication space server 170 (e.g. from the storage device 214 of the multi-party communication space server 170). It will be recognized that the preceding are merely examples of receiving video content of the multi-party video communication session directly and indirectly and that other examples exist.

In one embodiment, the video content received by the video receiver module 304 is received in real time. For example, assume the video receiver module 304 is included in an ad server 101 and communicatively coupled to the multi-party communication space server 170, in one embodiment, the video receiver module 304 receives the video content when the multi-party communication space server 170 receives the video content. To summarize and simplify, in one embodiment, the video receiver module 304 receives a live stream of video content of a multi-party video communication session.

In one embodiment, the video receiver module 304 passes the video content of a multi-party video communication session to the video sampler module 308. For example, the video receiver module 304 is communicatively coupled to the video sampler module 308 to send the video content of a multi-party video communication session to the video sampler module 308. In another embodiment, the video receiver module 304 passes the video content of a multi-party video communication session to the optional video segmentation module 306. For example, the video receiver module 304 is communicatively coupled to the optional video segmentation module 306 to send the video content of a multi-party video communication session to the optional video segmentation module 306. In another embodiment, the video receiver module 304 (or the communication interface 302) stores the video content of a multi-party video communication session in the storage device 214 (or any other non-transitory storage medium communicatively accessible). The other modules of the animation module 220, for example the optional video segmentation module 306 or the video sampler module 308 (depending on the embodiment), can retrieve the video content of a multi-party video communication session by accessing the storage device 214 (or other non-transitory storage medium).

The optional video segmentation module 306 is code and routines for segmenting the video content of a multi-party video communication session. In one embodiment, the video segmentation module 306 is a set of instructions executable by the processor 206. In another embodiment, the video segmentation module 306 is stored in the memory 208 and is accessible and executable by the processor 206. In either embodiment, the video segmentation module 306 is adapted for cooperation and communication with the processor 206, other components of the computing device 200 and other components of the animation module 220.

The video segmentation module 306 segments the video content of a multi-party video communication session. In some embodiments, it may not be desirable to generate an animation of the video content as a whole; therefore, the video segmentation module 306 segments the video content. For example, assume the animation is to serve as a preview of the multi-party video communication session, in one embodiment, the video segmentation module 306 segments the video content to create a video segment comprising 30 seconds of recent video content. It will be recognized that the preceding is merely an example of segmenting video content and an example of a segment of video content and that other examples exist.

In one embodiment, the video segmentation module 306 segments the video content periodically. Examples of types of periods include, but are not limited to, time, number of frames, etc. For example, the video segmentation module 306 segments the video content every 3600 frames, to generate a segment of video content 3600 frames in duration. In another example, the video segmentation module 306 segments the video content every 30 second, to generate a segment of video content 30 seconds in duration. It will be recognized that the preceding are merely examples of periodic segmentation and that other types of periods and other durations exist.

In one embodiment, the video segmentation module 306 segments the video content responsive to a request. For example, assume a request for an animation is received by the request receiver module 312 (discussed below), in one embodiment, the video segmentation module 306 segments the video content to generate a segment of video content including the video content of a predetermined duration prior to the receipt of the request. For example, the video segmentation module 306 generates a segment including 45 seconds of video content of the multi-party video communication session immediately preceding the receipt of the request. It will be recognized that the preceding are merely examples of a request and a duration that others exist.

In one embodiment, the video content received by the video receiver module 304 includes video content of a plurality of participating user devices 115. In one such embodiment, the optional video segmentation module 306 segments the video content from each of the plurality of participating user devices 115. For example, assume the video content includes video content associated with a moderator and video content associated with an active secondary user, in one embodiment, the video segmentation module 306 segments the video content to generate a one-thousand frame segment of video content associated with the moderator and a one-thousand frame segment of video content associated with the active secondary user. In on embodiment, the video segmentation module 306 generates concurrent segments. For example, the one-thousand frame segment of video content associated with the moderator occurred at the same time as the one-thousand frame segment of video content associated with the active secondary user. It will be recognized that the preceding are merely examples of segmenting video content of a plurality of participating user devices 115 and that other examples exist.

In one embodiment, the video segmentation module 306 passes the one or more segments of video content to the video sampler module 308. For example, the video segmentation module 306 is communicatively coupled to the video sampler module 308 to send the one or more segments of video content to the video sampler module 308. In another embodiment, the video segmentation module 306 (or the communication interface 302) stores the one or more segments of video content in the storage device 214 (or any other non-transitory storage medium communicatively accessible). The other modules of the animation module 220, for example, the video sampler module 308, can retrieve the one or more keyword signals by accessing the storage device 214 (or other non-transitory storage medium).

The video sampler module 308 is code and routines for generating a plurality of video frames. In one embodiment, the video sampler module 308 is a set of instructions executable by the processor 206. In another embodiment, the video sampler module 308 is stored in the memory 208 and is accessible and executable by the processor 206. In either embodiment, the video sampler module 308 is adapted for cooperation and communication with the processor 206, other components of the computing device 200 and other components of the animation module 220.

The video sampler module 308 generates a plurality of video frames from the video content or a segment thereof (depending upon the embodiment). In one embodiment, the video sampler module 308 generates a plurality of video frames by sampling the video content or segment thereof (depending upon the embodiment) periodically. In one embodiment, the sampling period is absolute. For example, the video sampler module 308 samples every nth frame of the video content where n is a fixed constant. In another example, the video sampler module 308 samples a frame every X hundredths of a second where X is a fixed constant. In one embodiment, the sampling period is relative to the length of the video content or the segment (depending on the embodiment) from which the plurality of video frames are being generated. For example, assume the video sampler module 308 generates one-hundred video frames per video content received, in one embodiment, the video sampler module 308 generates one-hundred frames periodically from one-hundred minutes of video content by sampling the video content once every minute and generates one-hundred frames from one-hundred seconds of video content by sampling the video content once every second; therefore, the period of sampling is relative to the length of the video content or the segment (depending on the embodiment) from which the plurality of video frames are being generated. It will be recognized that the preceding are merely examples of periodic sampling video content to generate a plurality of video frames and that other examples exist.

In one embodiment, the video sampler module 308 generates the plurality of video frames by sampling the video content at a high rate (i.e. a short period), such that when the animation is displayed to the user, the animation is visually indistinguishable from video. For example, assume an average user's visual system can process 10 frames per second perceiving each frame individually, and that when a user watches an animation with a rate above 10 frames per second the user's visual system processes the frames such that motion and continuity are perceived, in one embodiment, the video sampler module 308 generates the plurality of video frames by sampling more than 10 frames per second of video content. It will be recognized that the preceding is merely an example of sampling video content so that when the animation is displayed the animation is visually indistinguishable from video and that other examples exist.

In one embodiment, the video sampler module 308 passes the plurality of video frames to the conversion module 310. For example, the video sampler module 308 is communicatively coupled to the conversion module 310 to send the plurality of video frames to the conversion module 310. In another embodiment, the video sampler module 308 (or the communication interface 302) stores the plurality of video frames in the storage device 214 (or any other non-transitory storage medium communicatively accessible). The other modules of the animation module 220, for example, the conversion module 310, can retrieve the plurality of video frames by accessing the storage device 214 (or other non-transitory storage medium).

The conversion module 310 is code and routines for generating a plurality of images based at least in part on the plurality of video frames and generating an animation file based at least in part on the plurality of images. In one embodiment, the conversion module 310 is a set of instructions executable by the processor 206. In another embodiment, the conversion module 310 is stored in the memory 208 and is accessible and executable by the processor 206. In either embodiment, the conversion module 310 is adapted for cooperation and communication with the processor 206, other components of the computing device 200 and other components of the animation module 220.

The conversion module 310 generates a plurality of images based at least in part on the plurality of video frames. In one embodiment, the conversion module 310 converts each of the plurality of video frames into an image format to generate a plurality of images based at least in part on the plurality of video frames. For example, assume the video sampler module 308 generated 3,000 video frames, in one embodiment, the conversion module 310 generates 3,000 images by converting the video frames into an image format. It will be recognized that the preceding is merely an example of generating a plurality of images based at least in part on the plurality of video frames and that other examples exist.

In one embodiment, generating a plurality of video frames based at least in part on the plurality of video frames includes data compression. For example, assume the plurality of images have the Graphical Interchange Format (GIF) and that GIF images are compressed using the Lempel-Ziv-Welch (LZW) lossless data compression technique, in one embodiment, the conversion module 310 converts the plurality of images into the GIF format at least in part by using the Lempel-Ziv-Welch (LZW) lossless data compression technique. It will be recognized that the preceding is merely an example of an image format and a data compression technique and that other examples exist.

The conversion module 310 generates an animation file based at least in part on the plurality of images. In one embodiment, an animation file includes the plurality of images and animation delay information. Animation delay information is data and information that controls how long an image is displayed to a user 125 via a user device 115 before displaying the next image. For example, assume the animation is to be played at approximately 15 frames per second, in one embodiment, the animation delay information is approximately 0.07 seconds. It will be recognized that the preceding is merely an example of animation delay information and that other examples exist.

In one embodiment, the animation delay information is defined at least in part by a user. For example, assume the user is a system administrator of the ad server 101, in one embodiment, the system administrator defines the animation delay information (e.g. by hard coding). It will be recognized that the preceding is merely an example of animation delay information defined at least in part by a user and that other examples exist.

In one embodiment, the animation delay information is defined at least in part by the system 100. For example, assume that browsers and/or displays of the user devices 115 which display animations have a maximum refresh rate (i.e. minimum animation delay), in one embodiment, the animation delay information is defined so that the maximum refresh rate of a browser and/or display of the user devices 115 is not exceeded. It will be recognized that the preceding is merely an example of animation delay information defined at least in part by the system and that other examples exist.

In one embodiment, the animation delay information is defined based at least in part on the sampling period of the video sampler module 308. In one embodiment, the animation delay information is the same as the sampling period of the video sampler module 308. For example, assume the video sampler module 308 samples the video content at a rate of 24 frames per second (i.e. a sampling period of ¹⁄₂₄th of a second), in one embodiment, the conversion module 310 generates an animation file including animation delay information of ¹⁄₂₄th of a second. In another example, assume the video sampler module 308 generates one-thousand video frames at evenly spaced intervals over the duration of the video content and the sampling period, therefore, is dynamic and based at least in part on the duration of the video content, in one embodiment, the conversion module 310 receives the dynamic sampling period from the video sampler module 308. It will be recognized that the preceding are merely examples of animation delay information defined at least in part by the sampling period of the video sampler module 308 and that other examples exist.

In one embodiment, the conversion module 310 generates a plurality of images based at least in part on video content of a plurality of participating user devices 115 and generates an animation file based at least in part on the plurality of images, i.e., an animation file based at least in part on video content of a plurality of participating user devices 115. For example, assume the video receiver module 304 receives video content of a plurality of user devices 115 and the video sampler module 308 generates a plurality of video frames from each of the plurality of user devices 115, in one embodiment, the conversion module 310 generates a plurality of images based at least in part on the plurality of video frames from each of the plurality of user devices 115 and generates a single animation file based at least in part on the images. It will be recognized that the preceding is merely an example of generating an animation file based at least in part on video content of a plurality of participating user devices 115 and that other examples exist.

The creation of a single animation file based at least in part on video content from a plurality of user devices 115 beneficially ensures that the animation is displayed properly. For example, assume the desired animation includes is an animation based at least in part on concurrent video content of a moderator and a secondary user. Generating two animation files (i.e. one for the moderator and one for the secondary user) and providing the two animation files for display together do not ensure that the two animations will be displayed properly, for example, the animations may not be synchronized when displayed. Therefore, in one embodiment, the conversion module 310 generates an animation file based at least in part on video content of a plurality of participating user devices 115.

In some embodiments, the animation file generated by the conversion module 310 includes looping information. Examples of looping information includes, but is not limited to, one or more of whether the animation file is displayed in a loop when displayed to a user 125 via a user device 115, how many loops of the animation are displayed when displayed to a user 125 via a user device 115, etc. In one embodiment, the animation is not looped unless the animation file when displayed meets a threshold duration. For example, assume the animation is not looped unless the animation is 30 seconds or longer in duration, in one embodiment, the conversion module 310 determines based at least in part on the number of images and the animation delay information whether the animation duration meets the threshold and generates the animation file including looping information based on whether the 30 second threshold duration is met. It will be recognized that the preceding is merely an example of a threshold duration and that other examples exist.

In one embodiment, the conversion module 310 generates an animation file in a file format that has broad support across various types of user devices 115 and/or browsers. An example of an animated file format that is broadly supported is an animated GIF file; however, it will be recognized that other examples of broadly supported animation file formats exist.

In one embodiment, the plurality of images generated by the conversion module 310 each have the GIF image file format and the animation file generated by the conversion module 310 is an animated GIF animation file. For example, in one embodiment, the conversion module 310 receives/retrieves the plurality of video frames, converts each video frame into a GIF image and generates an animation file from the plurality of GIF images.

In one embodiment, the conversion module 310 passes the animation file to the animation display module 314. For example, the conversion module 310 is communicatively coupled to the animation display module 314 to send the animation file to the animation display module 314. In another embodiment, the conversion module 310 (or the communication interface 302) stores the animation file in the storage device 214 (or any other non-transitory storage medium communicatively accessible). The other modules of the animation module 220 including the animation display module 314 can retrieve the animation file by accessing the storage device 214 (or other non-transitory storage medium).

The request receiver module 312 is code and routines for receiving a request. In one embodiment, the request receiver module 312 is a set of instructions executable by the processor 206. In another embodiment, the request receiver module 312 is stored in the memory 208 and is accessible and executable by the processor 206. In either embodiment, the request receiver module 312 is adapted for cooperation and communication with the processor 206, other components of the computing device 200 and other components of the animation module 220.

The request receiver module 312 receives a request. Examples of requests include but are not limited to a request for an animation file and a request for textual content. It will be recognized that the preceding are merely examples of requests and that other examples exist.

In one embodiment, the request is a request for an animation. For example, assume a user desires an animation file of video content of a multi-party video communication session, in one embodiment, the user requests an animation file via a user device 115 and the request receiver module 312 receives the request for an animation file. It will be recognized that the preceding is merely an example of a request for an animation file and that other examples exist.

In one embodiment, the request is a request for textual content to be displayed on one or more websites that is associated with a multi-party video communication session. Textual content to be displayed on one or more websites is occasionally referred to herein as "textual content." Examples of textual content include but are not limited to one or more of a webpage, search result, social network stream, social network profile, e-mail, advertisement (e.g. an advertisement associated with a search, news article, e-mail, web page, social network profile or stream, etc.), a recipe, an article, a title associated with a multi-party video communication session, etc. It will be recognized that the preceding are merely examples of textual content and that other examples exist. For example, assume the user has requested to view a website associated with an advertisement associated with a multi-party video communication session, in one embodiment, the request receiver module 312 receives the request for textual content associated with a multi-party video communication session. It will be recognized that the preceding is merely an example of receiving a request for textual content associated with a multi-party video communication session and that other examples exist.

In one embodiment, an animation based at least in part on video content associated with a multi-party video communication session is generated responsive to the request receiver module 312 receiving a request. For example, in one embodiment, one or more of the video receiver module 304, optional video segmentation module 306, video sampler module 308 and conversion module 310 execute responsive to the request receiver module 312 receiving a request. For example, assume that the video receiver module 304 receives video content regardless of whether a request is received by the request receiver module 312; however, in one embodiment, the video sampler module 308 generates a plurality of video frames based on the video content, and the conversion module 310 generates a plurality of images based at least in part on the plurality of video frames and generates an animation based at least in part on the plurality of images responsive to the request receiver module 312 receiving a request. It will be recognized that the preceding is merely an example of one or more of the video receiver module 304, optional video segmentation module 306, video sampler module 308 and conversion module 310 executing responsive to the request receiver module 312 receiving a request and that other examples exist.

In one embodiment, the request receiver module 312 passes the request to one or more of the video receiver module 304, optional video segmentation module 306, video sampler module 308 and conversion module 310. For example, the request receiver module 312 is communicatively coupled to one or more of the video receiver module 304, optional video segmentation module 306, video sampler module 308 and conversion module 310 to send the request to one or more of the video receiver module 304, optional video segmentation module 306, video sampler module 308 and conversion module 310. In another embodiment, the request receiver module 312 (or the communication interface 302) stores the request in the storage device 214 (or any other non-transitory storage medium communicatively accessible). The other modules of the animation module 220 including one or more of the video receiver module 304, optional video segmentation module 306, video sampler module 308 and conversion module 310 can retrieve the request by accessing the storage device 214 (or other non-transitory storage medium).

In one embodiment, an animation based at least in part on video content associated with a multi-party video communication session is generated periodically regardless of whether the request receiver module 312 receives a request. For example, in one embodiment, the video receiver module 304, video segmentation module 306 (depending on the embodiment), video sampler module 308 and conversion module 310 execute periodically. For example, assume the video receiver module 304 receives video content, the video segmentation module 306 (depending on the embodiment) segments the video content, the video sampler module 308 generates a plurality of video frames based on the video content or segment thereof (depending on the embodiment), and the conversion module 310 generates a plurality of images based at least in part on the plurality of video frames and generates an animation based at least in part on the plurality of images every minute regardless of whether a request is received by the request receiver module 312. It will be recognized that the preceding is merely an example of one or more of the video receiver module 304, video segmentation module 306 (depending on the embodiment), video sampler module 308 and conversion module 310 executing periodically and that other examples exist. Furthermore, it will be recognized the preceding is merely an example of a period and that other periods exist.

In one embodiment, regardless of whether the animation file was generated responsive to the request receiver module 312 receiving a request or not, the animation file based at least in part on video content associated with a multi-party video communication session is provided for display responsive to the request receiver module 312 receiving a request. For example, in one embodiment, the animation display module (discussed below) executes providing the animation file for display responsive to the request receiver module 312 receiving a request. It will be recognized that the preceding is merely an example of providing an animation file based at least in part on video content associated with a multi-party video communication session for display responsive to the request receiver module 312 receiving a request and that other examples exist.

In one embodiment, the request receiver module 312 passes the request to the animation display module 314. For example, the request receiver module 312 is communicatively coupled to the animation display module 314 to send the request to the animation display module 314. In another embodiment, the request receiver module 312 (or the communication interface 302) stores the request in the storage device 214 (or any other non-transitory storage medium communicatively accessible). The other modules of the animation module 220 including the animation display module 314 can retrieve the request by accessing the storage device 214 (or other non-transitory storage medium).

The animation display module 314 is code and routines for providing the animation file for display. In one embodiment, the animation display module 314 is a set of instructions executable by the processor 206. In another embodiment, the animation display module 314 is stored in the memory 208 and is accessible and executable by the processor 206. In either embodiment, the animation display module 314 is adapted for cooperation and communication with the processor 206, other components of the computing device 200 and other components of the animation module 220.

In one embodiment, the animation display module 314 provides an animation file for display. In one embodiment, the animation display module 314 provides the animation file for display with the textual content associated with the multi-party video communication session. In one such embodiment, the textual content is associated with the multi-party video communication session upon which the animation file is based. For example, assume a user requests search results (i.e. textual content) from the search server 180 via a user device 115, in one embodiment, responsive to the request receiver module 312 receiving the request for search results, the animation display module 314 provides an animation file for display with search results and/or an advertisement displayed with the search results, wherein a search result and/or the advertisement is associated with the multi-party video communication session upon which the animation file is based. It will be recognized that the preceding is merely an example of provides the animation file for display with textual content associated with the multi-party video communication session and that other examples exist.

In one embodiment, the animation display module 314 provides for display the animation file and the textual content associated with the multi-party video communication session. In one such embodiment, the textual content is associated with the multi-party video communication session upon which the animation file is based. For example, assume the request receiver module 312 receives a request for search results (i.e. textual content), in one embodiment, the animation display module 314 provides for display an animation file and the search results, wherein a search result is associated with the multi-party video communication session upon which the animation file is based. It will be recognized that the preceding is merely an example of providing an animation file and textual content associated with multi-party video communication session for display and that other examples exist.

In one embodiment, the animation display module 314 provides a mechanism by which a user device 115 can be connected to the multi-party video communication session associated with the animation. A mechanism by which a user device 115 can be connected to the multi-party video communication session associated with the animation is occasionally referred to herein as a "connection mechanism." Examples of connection mechanisms include but are not limited to a button, check-box, drop-down menu, hypertext link, etc. For example, assume the connection mechanism is a graphical user interface (GUI) button, in one embodiment, a user via the user device 115 selects the GUI button and the user device 115 is connected to the multi-party video communication session. It will be recognized that the preceding are merely examples of connection mechanisms and that other examples exist.

In one embodiment, the user device 115 is connected to the multi-party video communication session associated with the animation subject to user login. For example, a user via the user device 115 selects the connection mechanism and the user device 115 routed to a login page (e.g. the login page of the multi-party communication space server 170) where the user logs in (e.g. using a username and password, or other credentials) and responsive to a successful login the user device 115 is connected to the multi-party video communication session. In another example, assume the user is already logged in (e.g. logged into the multi-party communication space server 170) and the user via the user device 115 selects the connection mechanism, in one embodiment, the user device 115 is connected to the multi-party video communication session. It will be recognized that the preceding are merely examples of connecting a user device 115 to the multi-party video communication session associated with the animation subject to user login and that other examples exist.

In one embodiment, the animation display module 314 provides a plurality of connection mechanisms. In one embodiment, each of the plurality of connection mechanisms connects the user device 115 to the multi-party video communication session associated with the animation as a different type of participant. For example, assume the plurality of mechanisms are hypertext links "Join" and "View," in one embodiment, when a user selects the "Join" link via the user device 115, the user device 115 is connected to the multi-party video communication session such that the user is an active secondary participant, and when the user selects the "View" link via the user device 115, the user device 115 is connected to the multi-party video communication session such that the user is a passive secondary participant. It will be recognized that the preceding is merely an example of providing a plurality of connection mechanisms wherein each connection mechanism connects the user device 115 to the multi-party video communication session associated with the animation as a different type of participant and that other examples exist.

In one embodiment, the animation display module 314 sends the animation file for display to the user 125. For example, the animation display module 314 is communicatively coupled to the user device 115 to send the animation file to the user device 115. In another embodiment, the animation display module 314 (or the communication interface 302) stores the animation file in the storage device 214 (or any other non-transitory storage medium communicatively accessible). The other components of the system 100, e.g., the communication interface 302, can request the animation file, which is retrieved by accessing the storage device 214 (or other non-transitory storage medium), and send the animation file for display to the user 125 via a user device 115.

In one embodiment, the animation display module 314 sends one or more of a mechanism and textual content with the animation file for display to the user 125. For example, the animation display module 314 is communicatively coupled to the user device 115 to send one or more of a mechanism and textual content with the animation file to the user device 115. In another embodiment, the animation display module 314 (or the communication interface 302) stores one or more of a mechanism and textual content with the animation file in the storage device 214 (or any other non-transitory storage medium communicatively accessible). The other components of the system 100, e.g., the communication interface 302, can request one or more of a mechanism and textual content with the animation file, which is retrieved by accessing the storage device 214 (or other non-transitory storage medium), and send one or more of a mechanism and textual content with the animation file for display to the user 125.

In some embodiments, the animation based at least in part on video content associated with a multi-party video communication session serves as a preview of the multi-party video communication session. Therefore, in one embodiment, the animation file provided for display by the animation display module 314 is an up-to-date animation file based at least in part on recent video content associated with a multi-party video communication session in order to provide the user an accurate preview of what is occurring in the video communication session. The animation module 220 may update the animation file in any number of ways depending upon the embodiment. For example, assume the video receiver module 304 receives a live stream of video content associated with the multi-party video communication session and the video segmentation module 306 segments the video content into 30 second segments, in one embodiment, responsive to the request receiver module 312 receiving a request, the video sampler module 308 generates a plurality of video frames from the most recent 30 second segment, the conversion module 310 generates a plurality of images based at least in part on the plurality of video frames and generates an animation file based at least in part on the plurality of images, and the animation display module 314 provides the animation file for display. In another embodiment, the modules 304, 306 (depending on the embodiment), 308 and 310 execute periodically to generate an animation file and the animation display module 314 provides the most recently generated animation file for display responsive to the request receiver module 312 receiving a request. It will be recognized that the preceding are merely examples of providing for display an up-to-date animation file based at least in part on recent video content associated with a multi-party video communication session in order to provide the user an accurate preview of what is occurring in the video communication session and that other examples exist.

Figure 4:
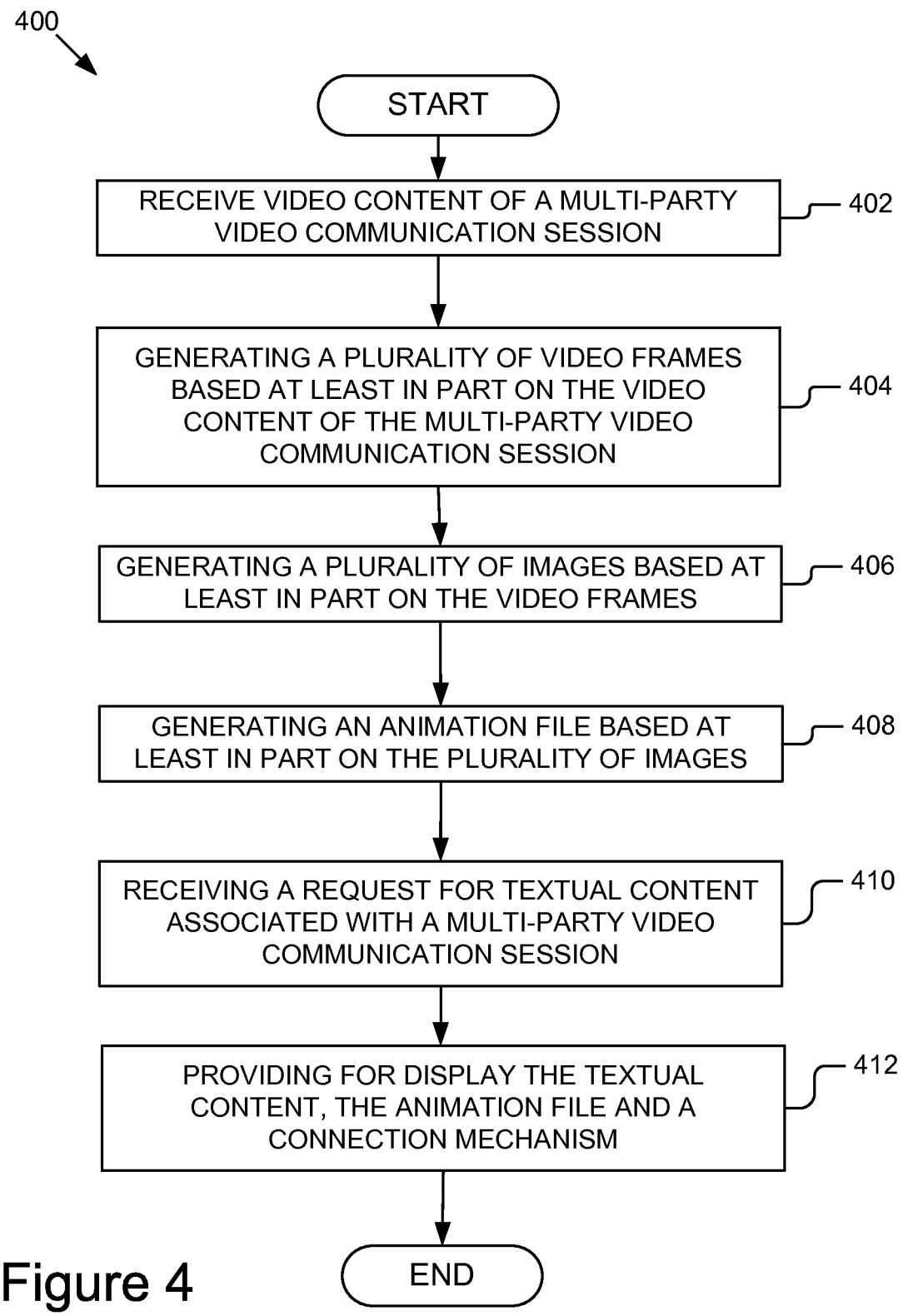
FIG. 4 is a flow chart illustrating a method for generating an animation based at least in part on video content associated with a multi-party video communication session according to one embodiment.
Figure 5:
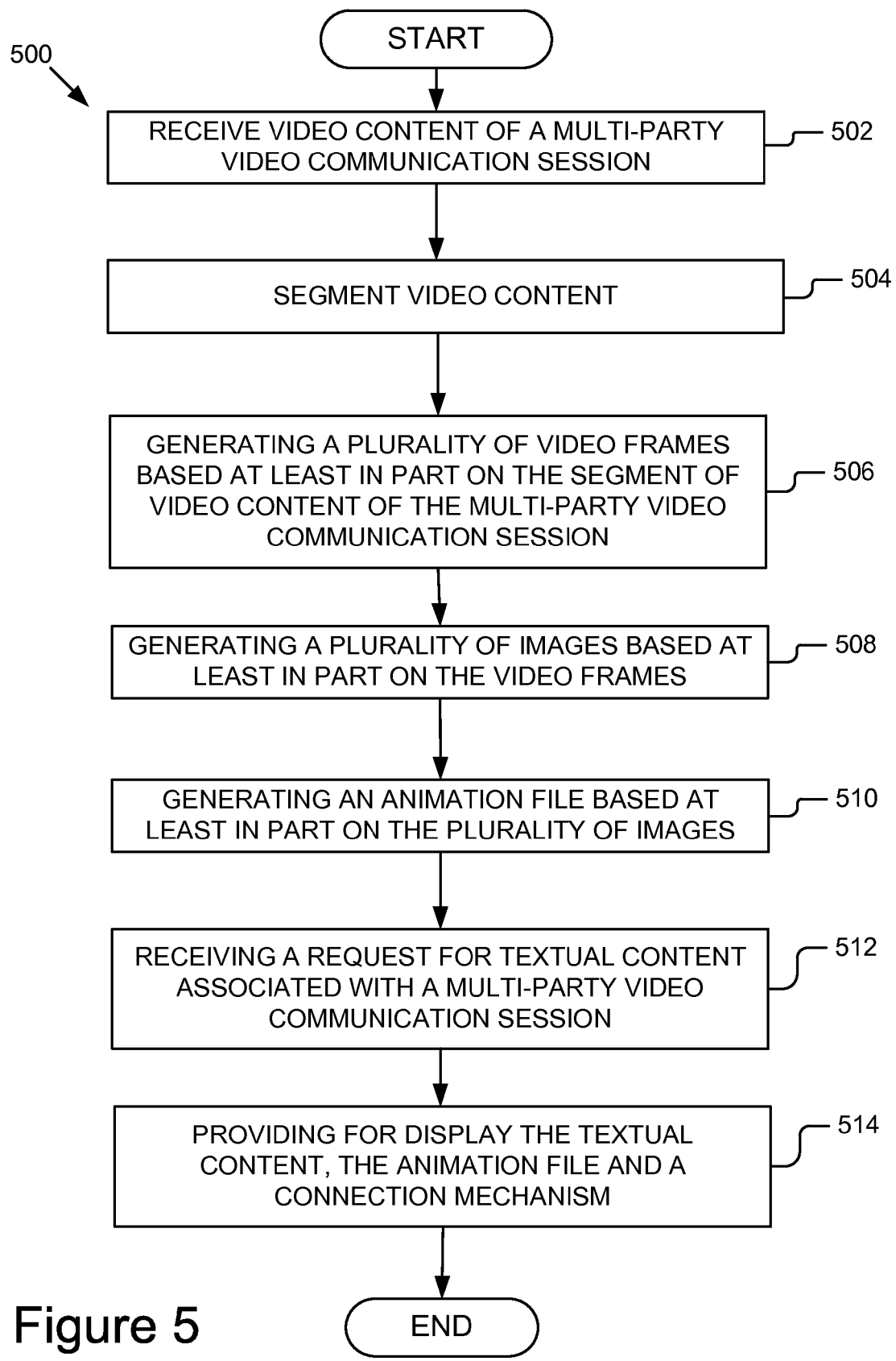
FIG. 5 is a flow chart illustrating a method for generating an animation based at least in part on a segment of video content associated with a multi-party video communication session according to one embodiment.
Figure 6:
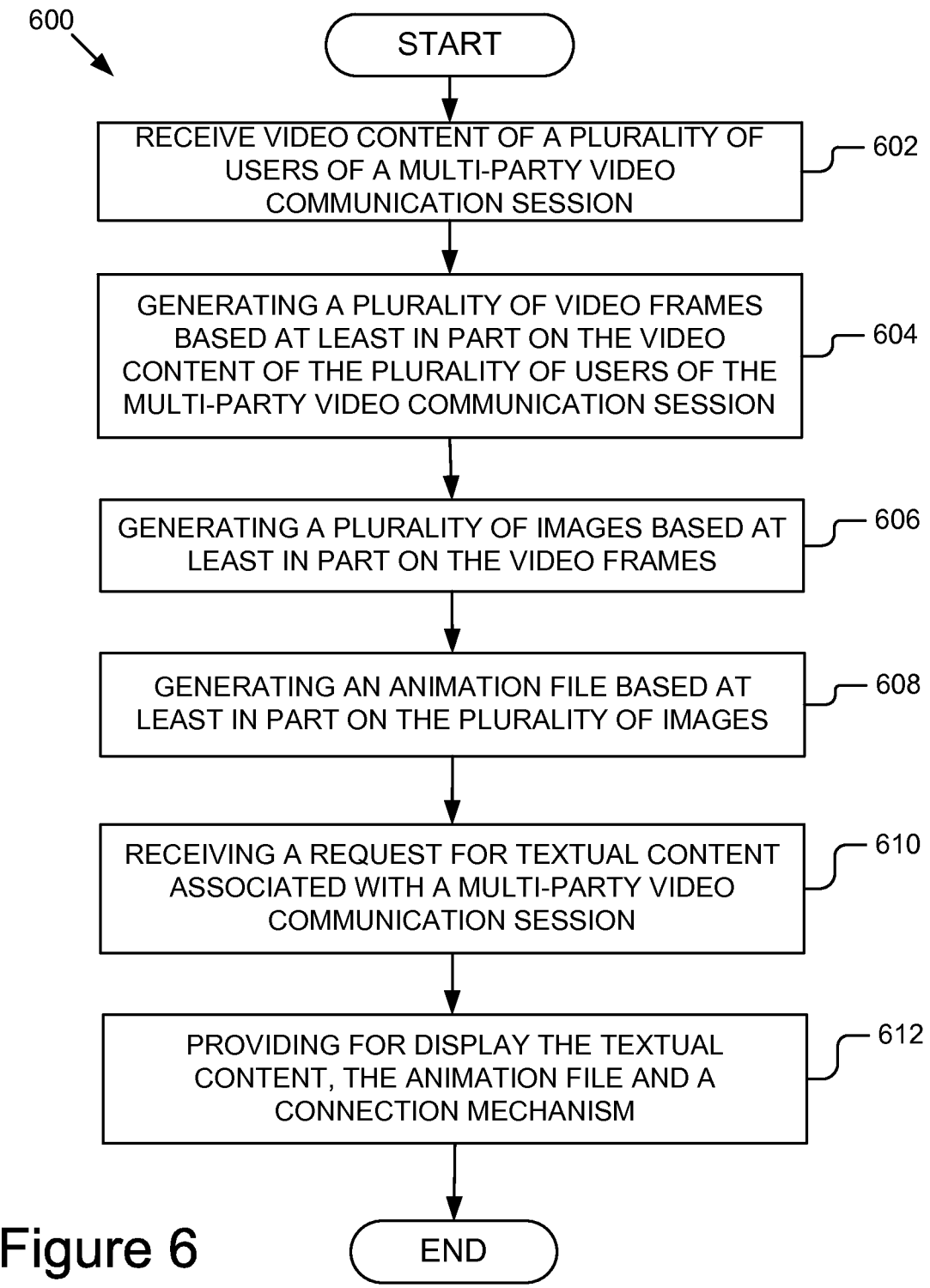
FIG. 6 is a flow chart illustrating a method for generating an animation based at least in part on video content of a plurality of user devices associated with a multi-party video communication session according to one embodiment.

FIGS. 4, 5 and 6 depict various methods 400, 500, 600 performed by the system described above in reference to FIGS. 1-3. Steps that are optional or performed by optional modules are depicted in dashed blocks.

FIG. 4 is a flow chart illustrating a method 400 for generating an animation based at least in part on video content associated with a multi-party video communication session according to one embodiment. At block 402, the video receiver module 304 of the animation module 220 receives video content of a multi-party video communication session. At block 404, the video sampler module 308 generates a plurality of video frames based at least in part on the video content received at block 402. At block 406, the conversion module 310 generates a plurality of images based at least in part on the plurality of video frames generated at block 404. At block 408, the conversion module 310 generates an animation file based at least in part on the plurality of images generated at block 406. At block 410, the request receiver module 312 receives a request (e.g. a request for textual content associated with the multi-party video communication session). At block 412, the animation display module 314 provides the animation file for display along with the textual content and a connection mechanism.

FIG. 5 is a flow chart illustrating a method 500 for generating an animation based at least in part on a segment of video content associated with a multi-party video communication session according to one embodiment. At block 502, the video receiver module 304 of the animation module 220 receives video content of a multi-party video communication session. At block 504, the video segmentation module 306 segments the video content received at block 502. At block 506, the video sampler module 308 generates a plurality of video frames based at least in part on a segment of video content. At block 508, the conversion module 310 generates a plurality of images based at least in part on the plurality of video frames generated at block 506. At block 510, the conversion module 310 generates an animation file based at least in part on the plurality of images generated at block 508. At block 512, the request receiver module 312 receives a request (e.g. a request for textual content associated with the multi-party video communication session). At block 514, the animation display module 314 provides the animation file for display along with the textual content and a connection mechanism.

FIG. 6 is a flow chart illustrating a method 600 for generating an animation based at least in part on video content of a plurality of user devices associated with a multi-party video communication session according to one embodiment. At block 602, the video receiver module 304 of the animation module 220 receives video content of a plurality of users of a multi-party video communication session. At block 604, the video sampler module 308 generates a plurality of video frames based at least in part on the video content of the plurality of users received at block 602. At block 606, the conversion module 310 generates a plurality of images based at least in part on the plurality of video frames generated at block 604. At block 608, the conversion module 310 generates an animation file based at least in part on the plurality of images generated at block 606. At block 610, the request receiver module 312 receives a request (e.g. a request for textual content associated with the multi-party video communication session). At block 612, the animation display module 314 provides the animation file for display along with the textual content and a connection mechanism. The animation file generated at block 608 ensures proper playback when displayed (not shown) by a user device (e.g. the animations of the video content of the various user devices are properly synchronized).

The foregoing description of the embodiments has been presented for the purposes of illustration and description. It is not intended to be exhaustive or to limit the present embodiments to the precise forms disclosed. Many modifications and variations are possible in light of the above teaching. It is intended that the scope of the present embodiments be limited not by this detailed description, but rather by the claims of this application. As will be understood by those familiar with the art, the present embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent, the modules, routines, features, attributes, methodologies and other aspects of the embodiments can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the embodiments are in no way limited to implementation in any specific programming language, or for any specific operating system or environment. Accordingly, the disclosure is intended to be illustrative, but not limiting, of the scope, which is set forth in the following claims.

What is claimed is:

1. A computer-implemented method comprising:

receiving, using one or more computing devices, video content of a multi-party video communication session, wherein the multi-party video communication session is associated with textual content to be displayed on one or more websites, and wherein the video content of the multi-party video communication session includes video content of each of one or more participating devices;

generating, using the one or more computing devices, a plurality of video frames based at least in part on the video content of the multi-party video communication session;

generating, using the one or more computing devices, a plurality of images, each image being generated at least in part on one of the video frames in the plurality of video frames;

generating, using the one or more computing devices, an animation file based at least in part on the plurality of images; and receiving, using the one or more computing devices, a request from a user device for the textual content associated with the multi-party video communication session;

providing for display to the user device, based at least in part on the request for the textual content associated with the multi-party video communication session, the textual content, the animation file, and a mechanism by which the user device can be connected to the multi-party video communication session.

2. A computer-implemented method comprising:

receiving, using one or more computing devices, video content of a multi-party video communication session, wherein the multi-party video communication session is associated with textual content to be displayed on one or more websites, and wherein the video content of the multi-party video communication session includes video content of each of one or more participating devices;

generating, using the one or more computing devices, a plurality of video frames based at least in part on the video content of the multi-party video communication session;

generating, using the one or more computing devices, a plurality of images, each image being generated at least in part on one of the video frames in the plurality of video frames;

generating, using the one or more computing devices, an animation file based at least in part on the plurality of images.

3. The method of claim 2, the method further comprising:
segmenting the received video content; and
wherein generating the plurality of video frames is based at least in part on a segment of the video content of the multi-party video communication session.

4. The method of claim 2, wherein the video content incudes a live video stream of the multi-party video communication session.

5. The method of claim 2, wherein the textual content includes one or more of a webpage, a search result, a social network stream, a social network profile, an e-mail, an advertisement, a recipe, an article and a title associated with the multi-party video communication session.

6. The method of claim 2, wherein generating the plurality of video frames includes sampling the video content at a high rate such that the animation file based at least in part on the plurality of video frames is visually indistinguishable from a video when displayed on the user device.

7. The method of claim 2, wherein generating the plurality of images, each image being generated at least in part on one of the video frames in the plurality of video frames, includes converting each of the video frames into an image file having a graphical interchange format (GIF).

8. The method of claim 2, wherein generating the animation file based at least in part on the plurality of images includes generating an animated graphics interchange format (GIF) file.

9. The method of claim 2, wherein the video content of the multi-party video communication session includes video content of each of a plurality of participating devices; and the generated animation file is a single file based at least in part on the video content of each of the plurality of participating devices.

10. The method of claim 2, wherein the animation file displayed is an up-to-date animation file based at least in part on recent video content associated with a multi-party video communication session.

11. The method of claim 1, wherein the mechanism by which the user device can be connected to the multi-party video communication session includes a first connection mechanism and a second connection mechanism, the first connection mechanism connects the user device to the multi-party video communication session as a first type of participant when selected, the second connection mechanism connects the user device to the multi-party video communication session as a first type of participant when selected.

12. The method of claim 11, wherein the first type of participant is an active secondary participant.

13. The method of claim 11, wherein the second type of participant is a passive secondary participant.

14. A system for generating an animation, the system comprising:
a video receiver module operable to receive video content of a multi-party video communication session, wherein the multi-party video communication session is associated with textual content to be displayed on one or more websites, and wherein the video content of the multi-party video communication session includes video content of each of one or more participating devices;

a video sampler module operable to generate a plurality of video frames based at least in part on the video content of the multi-party video communication session, the video sampler module communicatively coupled to the video receiver module to receive the video content of the multi-party video communication session;

a conversion module operable to generate a plurality of images, each image being generated at least in part on one of the video frames in the plurality of video frames, and to generate an animation file based at least in part on the plurality of images, the conversion module communicatively coupled to the video sampler module to receive the plurality of video frames;

a request receiver module operable to receive a request from a user device for the textual content associated with the multi-party video communication session, the request receiver module communicatively coupled to receive the request from the user device; and an animation display module operable to, based at least in part on the request for the textual content associated with the multi-party video communication session, provide for display, to the user device, the textual content, the animation file, and a mechanism by which the user device can be connected to the multi-party video communication session, the animation display module communicatively coupled to the conversion module to receive the animation file.

15. The system of claim 14, further comprising:
a video segmentation module operable to segmenting the received video content, the video segmentation module communicatively coupled to the video receiver module to receive the video content; and
wherein the video sampler module generates the plurality of video frames based at least in part on a segment of the video content of the multi-party video communication session, the video sampler module communicatively coupled to the video segmentation module to receive the segment of the video content.

16. The system of claim 14, wherein the video content incudes a live video stream of the multi-party video communication session.

17. The system of claim 14, wherein the textual content includes one or more of a webpage, a search result, a social network stream, a social network profile, an e-mail, an advertisement, a recipe, an article and a title associated with the multi-party video communication session.

18. The system of claim 14, wherein the video sampler module generates the plurality of video frames in part by sampling the video content at a high rate such that the animation file based at least in part on the plurality of video frames generated by the conversion module is visually indistinguishable from a video when displayed on the user device.

19. The system of claim 14, wherein the conversion module generates the plurality of images by converting each of the video frames into an image file having a graphical interchange format (GIF).

20. The system of claim 14, wherein the conversion module the animation file based at least in part on the plurality of images is an animated graphics interchange format (GIF) file.

21. The system of claim 14, wherein the video content of the multi-party video communication session received by the video receiver module includes video content of each of a plurality of participating devices; and the animation file generated by the conversion module is a single file based at least in part on the video content of each of the plurality of participating devices.

\* \* \* \* \*